United States Patent [19]
Funkhouser et al.

[11] Patent Number: 5,840,784
[45] Date of Patent: Nov. 24, 1998

[54] POLYMERIC COMPOSITIONS AND METHODS FOR USE IN LOW TEMPERATURE WELL APPLICATIONS

[75] Inventors: Gary P. Funkhouser; Keith A. Frost, both of Duncan, Okla.

[73] Assignee: Halliburton Energy Services, Inc., Duncan, Okla.

[21] Appl. No.: 851,991

[22] Filed: May 7, 1997

[51] Int. Cl.$^6$ ..................................................... C09K 7/00
[52] U.S. Cl. ........................... 523/130; 166/294; 166/295
[58] Field of Search ............................ 523/130; 166/294, 166/295

[56] References Cited

U.S. PATENT DOCUMENTS

| | | | |
|---|---|---|---|
| 3,334,689 | 8/1967 | McLaughlin | 166/33 |
| 3,490,533 | 1/1970 | McLaughlin | 166/270 |
| 3,727,691 | 4/1973 | Muecke et al. | 166/295 |
| 5,335,726 | 8/1994 | Rodrigues | 166/295 |
| 5,358,051 | 10/1994 | Rodrigues | 166/295 |

*Primary Examiner*—Kriellion S. Morgan
*Attorney, Agent, or Firm*—Robert A. Kent; Clark Dougherty, Jr.

[57] ABSTRACT

The present invention relates to improved methods and compositions for performing well completion or remedial procedures in subterranean zones having temperatures below about 70° F. The methods basically comprise the steps of introducing into the zone an aqueous solution of a polymerizable monomer, a polymerization initiator and an oxygen scavenger comprised of stannous chloride. Thereafter, the polymerizable monomer is allowed to polymerize in the zone. The stannous chloride scavenges oxygen without generating free radicals and causing premature polymerization.

22 Claims, No Drawings

POLYMERIC COMPOSITIONS AND METHODS FOR USE IN LOW TEMPERATURE WELL APPLICATIONS

BACKGROUND OF THE INVENTION

1. Field of the Invention.

This invention relates generally to well completion and remedial procedures including reducing the undesirable flow of water from subterranean zones, and more particularly, to improved polymeric compositions and methods for use in low temperature well applications.

2. Description of the Prior Art.

Sealing compositions have heretofore been utilized in subterranean well completion and remedial operations. For example, sealing compositions have been used in well completion operations whereby casings and liners are sealed in well bores. In performing such operations, a sealing composition is pumped into the annular space between the walls of a well bore and the exterior surfaces of a casing string or liner disposed therein. The sealing composition is permitted to gel or set in the annular space thereby forming an annular sealing mass therein. In remedial operations carried out in wells, sealing compositions are used to seal holes or cracks in casings and liners and in the sealing masses maintaining the casings and liners in well bores.

Oil and gas wells very often produce water in addition to the desired hydrocarbons. If the ratio of water produced to hydrocarbons produced by a well is relatively low, the produced water can be separated from the hydrocarbons and disposed of in a manner which does not make the operation of the well uneconomical. However, if uncontrolled large quantities of water are produced in addition to hydrocarbons by a well, the cost of pumping, handling, storing and disposing of the produced water often makes the continuing operation of the well uneconomical.

Polymeric compositions which form polymerized and crosslinked impermeable masses have been developed and used heretofore in well completion and remedial operations. For example, polymeric compositions have heretofore been used to reduce or terminate the flow of water from a subterranean zone penetrated by a well. Such compositions are introduced into a subterranean water producing zone and caused to polymerize and crosslink therein whereby a stable gel which reduces or terminates the water flow from the zone is formed therein. U.S. Pat. Nos. 3,334,689 issued Aug. 8, 1967 and 3,490,533 issued Jan. 20, 1970, both to McLaughlin, disclose polymerizable monomer solutions containing a polymerization catalyst for injection into subterranean zones. The solutions polymerize and are crosslinked in the zones to form stable gels which reduce the water permeabilities of the zones and decrease or terminate the flow of water therefrom.

U.S. Pat. Nos. 5,335,726 issued on Aug. 9, 1994 and 5,358,051 issued Oct. 25, 1994, both to Rodrigues, disclose methods of forming polymeric gels in subterranean zones to reduce or shut off the flow of water therefrom wherein a monomer is polymerized in the formation in the presence of a crosslinker by an initiator selected from certain azo compounds. Also, the use of hydroxy unsaturated carbonyl monomers is disclosed.

The aqueous solutions of monomer or monomer and crosslinker and a polymerization initiator have heretofore been pumped as low viscosity solutions into subterranean zones in which completion or remedial procedures are to be conducted. The low viscosity solutions polymerize after placement which results in the formation of sealing gels in the zones.

The polymerization of the monomer utilized is not initiated by the polymerization initiators heretofore used and/or does not proceed at an appreciable rate until oxygen-induced polymerization inhibition is overcome. That is, a polymeric solution contains dissolved oxygen which inhibits the polymerization of the monomer in the solution until all of the oxygen is consumed. The time required for the initiator to react with the oxygen present in the solution is known as the "induction period." The induction period enables placement of the polymeric solution in the zone to be sealed or plugged before polymerization of the solution prevents its flow into the zone.

While various polymerization initiators such as persulfates, peroxides and azo compounds have been utilized heretofore, azo compounds are generally preferred for the reason that they are less likely to cause premature gelation. Persulfates and peroxides are subject to premature oxidation-reduction activation when they contact certain reductants such as ferrous ion.

In performing completion or remedial operations in subterranean zones which exist at low temperatures, i.e., temperatures below about 70° F., normal quantities of azo polymerization initiators do not generate radicals for reacting with oxygen at a sufficient rate to overcome the oxygen inhibition in the time required. Consequently, high concentrations of azo polymerization initiators have heretofore been utilized in the polymeric solutions utilized in low temperature applications to shorten the induction time. In some cases, the solubility limits of the polymeric composition don't allow a high enough concentration of initiator to be dissolved in the composition. In other cases, the required high initiator concentration can be dissolved, but the sealing procedure is very costly due to the high cost of the high quantity of azo initiator required.

Attempts have been made to reduce the amounts of oxygen in the polymeric solutions used for the above described low temperature applications by combining oxygen scavengers therewith. However, the oxygen scavenging compounds heretofore used such as sodium bisulfite have not been successful due to their production of reactive radicals. That is, when the heretofore used oxygen scavenging compounds react with molecular oxygen they form reactive radicals which themselves initiate premature polymerization of the polymeric solution.

Thus, there is a need for improved low temperature polymeric compositions and methods for performing well completion and remedial operations whereby the induction period of the polymeric compositions is shortened without involving high costs.

SUMMARY OF THE INVENTION

The present invention provides improved polymeric compositions and methods of using the compositions for performing well completion or remedial procedures at low temperatures which meet the needs described above and overcome the deficiencies of the prior art.

The improved polymeric compositions of the present invention for use in low temperature well applications are basically comprised of water, a polymerizable monomer, an azo polymerization initiator and an oxygen scavenger comprised of stannous chloride. Stannous chloride is effective in a polymeric composition for removing oxygen and thereby activating low concentrations of azo initiators in low temperature environments without prematurely generating reactive free radicals, i.e., prematurely gelling the polymeric composition.

The improved methods of the invention for sealing a low temperature subterranean zone comprise the steps of introducing into the subterranean zone an aqueous solution of a polymerizable monomer, a polymerization initiator and an oxygen scavenger comprised of stannous chloride, and then allowing the polymerizable monomer to polymerize in the zone.

It is, therefore, a general object of the present invention to provide improved low temperature well completion or remedial polymeric compositions and methods.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods and compositions for carrying out well completion and remedial operations at low temperatures including reducing the undesirable flow of water from low temperature subterranean zones, i.e., zones having a temperature below about 70° F. The uncontrolled and undesirable flow of water from low temperature subterranean zones is often encountered in offshore wells drilled through shallow sediments. The temperatures encountered are in the range of from about 45° F. to about 65° F. which make treatments for reducing or terminating the flow of water difficult. That is, when a polymeric composition is utilized in such a low temperature zone, a high concentration of azo compound polymerization initiator is required. For example, the azo initiator concentration must be as high as about 80 pounds of initiator per 1,000 gallons of the polymeric composition which is impractical due to the high costs involved. This problem is solved by the present invention which provides improved methods and compositions for carrying out well completion and remedial operations at low temperatures such as terminating undesirable subterranean water flows whereby low concentrations of azo initiator are utilized, i.e., as little as about 5 pounds of initiator per 1,000 gallons of the polymeric compositions.

The improved polymeric compositions of this invention for performing well completion and remedial operations at temperatures below about 70° F. are basically comprised of water, a polymerizable monomer, an azo polymerization initiator and an oxygen scavenger comprising stannous chloride. As previously mentioned, it has been discovered that stannous chloride can be utilized as an activator in low temperature applications without the risk of premature polymerization due to the formation of free radicals. That is, the inclusion of a stannous chloride oxygen scavenger in a polymeric composition of this invention removes oxygen from the composition to thereby reduce the induction period thereof without generating reactive free radicals. Instead, the reaction of stannous chloride with oxygen produces an insoluble oxychloride compound.

The water used to form the polymeric compositions of this invention can be from any source provided it does not contain an excess of compounds that adversely affect other components in the compositions. For example, the water can be fresh water, seawater, brine or water containing various concentrations of one or more salts.

A variety of water soluble polymerizable monomers can be utilized in the polymeric compositions. Examples of such monomers include acrylic acid, methacrylic acid, acrylamide, methacrylamide, 2-methacrylamido-2-methyl propane sulfonic acid, 2-acrylamido-2-methyl propane sulfonic acid, N,N-dimethylacrylamide, vinyl sulfonic acid, N,N-dimethylamino-ethylmethacrylate, 2-triethylammoniumethyl methacrylate chloride, N,N-dimethylaminopropylmethacrylamide, methacrylamide, methacrylamidopropyl trimethylammonium chloride, N-vinyl pyrrolidone, vinylphosphonic acid and methacryloyloxyethyl trimethylammonium sulfate and mixtures thereof.

Additional more preferred monomers include hydroxyethylacrylate, hydroxymethylacrylate, hydroxyethylmethacrylate, N-hydroxymethylacrylamide, N-hydroxymethylmethacrylamide, polyethylene and polypropylene glycol acrylate and methacrylate and mixtures thereof. Of these, hydroxyethylacrylate is most preferred.

The polymerizable monomer or monomers are combined with the polymeric compositions in a general amount in the range of from about 5% to about 20% by weight of the compositions. Preferably, the polymerizable monomer or monomers are present in an amount in the range of from about 10% to about 15% by weight of the compositions, most preferably in an amount of about 15%.

The above monomers are often used in combination with crosslinking multifunctional vinyl monomers such as glycerol dimethacrylate and diacrylate, ethoxylated and propoxylated glycerol dimethacrylate and diacrylate, ethoxylated and propoxylated trimethacrylate and triacrylate, ethoxylated and propoxylated trimethylolpropane trimethacrylate and triacrylate, ethoxylated and propoxylated pentaerythritol di, tri and tetra methacrylate and acrylate, methylene-bis-acrylamide and methacrylamide, polyethylene and polypropylene glycol dimethacrylate and diacrylate, allylmethacrylate and acrylate and mixtures thereof. When used, the crosslinking monomers are included in the polymeric compositions in an amount in the range of from about 0.005% to about 0.5% by weight of the compositions.

The azo polymerization initiators which are suitable for use in accordance with this invention are defined by the following formula:

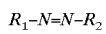

wherein:

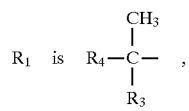

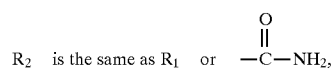

$R_3$ is $-CH_3$ or $-C\equiv N$,

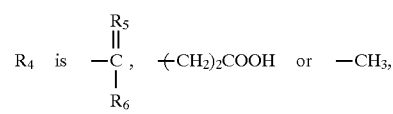

$R_5$ is $=N-$, $=NH$ or $=O$,

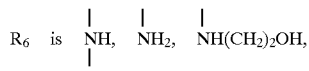

-continued

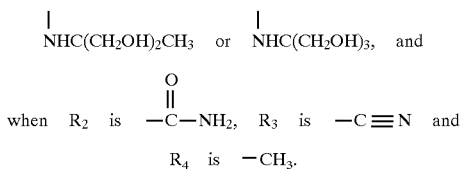

when $R_2$ is $-\overset{O}{\overset{\|}{C}}-NH_2$, $R_3$ is $-C\equiv N$ and $R_4$ is $-CH_3$.

Azo polymerization initiators within the scope of the above formula are temperature activated at various temperatures and are not activated by oxidation-reduction mechanisms. The term "activation temperature" is used herein to mean that temperature at which half the molar amount of a compound converts to free radicals in a period of 10 hours.

As is understood by those skilled in the art, a particular azo polymerization initiator can be selected for use in a polymeric composition of this invention which has an activation temperature equal to or slightly less than the temperature of the subterranean zone to be sealed. Further, since the azo compounds are not activated by oxidation-reduction mechanisms, the reducing metals commonly encountered in pumping equipment and tubular goods of wells do not cause premature gelation of the polymeric composition.

Examples of preferred azo compounds for use in accordance with this invention are 2,2'-azobis[2-(2-imidazolin-2-yl)propane] dihydrochloride, 2,2'-azobis(2-methylpropionamidine) dihydrochloride and 4,4'azobis(4-cyanovaleric acid). The most preferred azo polymerization initiator is 2,2'-azobis(2-methylpropionamidine) dihydrochloride. The foregoing azo compounds have activation temperatures in the range of from about 111° F. to about 156° F. The quantity of azo initiator employed is an amount in the range of from about 0.001% to about 2% by weight of the polymeric composition.

As mentioned above, the oxygen scavenger utilized in accordance with the present invention which activates low concentrations of azo initiators in low temperature environments without generating reactive free radicals is stannous chloride ($SnCl_2.2HOH$). When stannous chloride contacts dissolved oxygen and reacts therewith, it forms an insoluble oxychloride rather than free radicals which can cause premature gelation as do other oxygen scavenging compounds. In order to improve the solubility of stannous chloride whereby it can be readily combined with the polymeric composition, e.g., on the fly, the stannous chloride can be predissolved in a hydrochloric acid solution. For example, the stannous chloride can be dissolved in a 0.5% by weight aqueous hydrochloric acid solution in an amount of about 0.4% by weight of the resulting solution. The stannous chloride is included in the polymeric compositions of this invention in an amount in the range of from about 0.005% to about 0.1% by weight of the compositions.

In carrying out the methods of the present invention for sealing or plugging a subterranean zone having a temperature below about 70° F., a polymeric composition of the invention is introduced into the zone, i.e., an aqueous solution of a polymerizable monomer, an azo polymerization initiator and an oxygen scavenger comprised of stannous chloride. Thereafter, the polymerizable monomer in the aqueous solution is allowed to polymerize in the subterranean zone thereby forming a sealing or plugging gel therein.

In order to further illustrate the polymeric compositions and methods of this invention, the following examples are given.

EXAMPLE 1

A polymeric composition was prepared without the stannous chloride oxygen scavenger of this invention utilizing an 11.6 pound per gallon calcium chloride brine, 2-hydroxyethyl-acrylate monomer in an amount of 11% by weight of the composition and an azo polymerization initiator, i.e., 2,2'-azobis[2-(2-imidazolin-2-yl)propane] dihydrochloride. The initiator was included in test portions of the composition in amounts ranging from 29 to 58 pounds of initiator per 1,000 gallons of solution.

Each test portion of the polymeric composition was prepared with stirring at the test temperature and transferred to a 4 ounce square glass bottle containing a marble. The square glass bottle was completely filled with the composition and capped in a manner so as not to trap any air inside the bottle. Each bottle was placed in a water bath at the test temperature and checked at 15 minute intervals for gelation. That is, when the marble remained stationary or moved very slowly as the bottle was inverted, the formation of a gel was indicated. The results of these tests are given in Table I below.

TABLE I

| Azo Initiator Concentration, Pounds Per 1,000 Gallons Of Composition | Gelation Time Tests | |
|---|---|---|
| | Gelation Time At 65° F., Hours | Gelation Time At 50° F., Hours |
| 29 | 4.9 | >9 |
| 39 | 3.6 | >9 |
| 49 | 2.9 | >9 |
| 58 | 2.4 | >9 |

As shown in Table I, because the test compositions did not contain the stannous chloride oxygen scavenger of the present invention, high concentrations of azo initiator were required to produce gelation times at 65° F. in the range of from about 2 to 4 hours. At 50° F., the gel times were in excess of 9 hours even at the highest concentration of 58 pounds per 1,000 gallons of composition.

Example 2

An additional 11.6 pound per gallon calcium chloride polymeric composition was prepared using the same components and quantities as described in Example 1 above. In addition, the stannous chloride oxygen scavenger of the present invention was added to the composition. The stannous chloride was dissolved in a 0.5% by weight aqueous hydrochloric acid solution in an amount of 0.4% by weight of the hydrochloric acid solution. The resulting solution was combined with the polymeric composition in an amount of 30 gallons per 1,000 gallons of composition. The composition was divided into test portions and various quantities of azo initiator were added thereto. The azo initiator used was 2,2'-azobis(2-methylpropionamidine) dihydrochloride. Gelation time tests were conducted on the test compositions at 50° F. only. In addition, test compositions containing 10 and 20 pounds per 1,000 gallons of the azo initiator without the stannous chloride oxygen scavenger were tested for gelation times at 50° F. for comparative purposes. The results of these tests are set forth in Table II below.

TABLE II

Gelation Time Tests

| Azo Initiator Concentration, Pounds Per 1,000 Gallons Of Composition | Gelation Time At 50° F., Hours |
|---|---|
| 2 | 2.75 |
| 4 | 1.75 |
| 6 | 1.25 |
| 10 | 1 |
| 10[1] | >48 |
| 20[1] | >48 |

[1]Stannous chloride not included in composition.

As shown in Table II, the presence of the stannous chloride oxygen scavenger in the test compositions drastically reduced their gelation times at low concentrations of azo initiator.

Example 3

An additional polymeric composition containing the components in the quantities described in Example 2 was prepared except that synthetic seawater was used instead of calcium chloride brine. The synthetic seawater was prepared by dissolving 41.95 grams of sea salt commercially available from Lake Products Company, Inc. in distilled water to make one liter of solution. As in Example 2, the polymeric composition was divided into test portions and various quantities of the same azo initiator as was used in Example 2 were added to the test portions. The resulting test compositions were tested for gelation times at 65° F. and 50° F. For comparative purposes, test compositions which did not contain the stannous chloride oxygen scavenger were also tested for gelation times. The results of these tests are given in Table III below.

TABLE III

Gelation Time Tests

| Azo Initiator Concentration, Pounds Per 1,000 Gallons Of Composition | Gelation Time At 65° F., Hours | Gelation Time At 50° F., Hours |
|---|---|---|
| 2 | 9 | — |
| 4 | 3.75 | — |
| 6 | 2.25 | — |
| 10 | 1.5 | — |
| 10[1] | >48 | — |
| 15 | — | 6.25 |
| 20 | — | 3.75 |
| 30 | — | 2.5 |
| 45 | — | 1.75 |
| 45[1] | — | >48 |

[1]Stannous chloride not included in composition.

From Table III it can be seen that the seawater polymeric compositions of this invention are very effective at low temperatures utilizing low concentrations of azo polymerization initiator.

Example 4

An additional polymeric composition was prepared utilizing the same components in the same quantities as described in Example 3 except that a 9.9 pound per gallon seawater/sodium chloride brine was utilized. The seawater/sodium chloride brine was prepared by dissolving 221 grams of reagent grade sodium chloride in 763 milliliters of synthetic seawater prepared as described in Example 3. The polymeric composition was divided into test portions and various quantities of the same azo polymerization initiator as was used in Example 3 were added thereto. The test compositions were tested for gelation times at 65° F. and 50° F. For comparative purposes, test compositions not containing stannous chloride were also tested. The results of these tests are given in Table IV below.

TABLE IV

Gelation Time Tests

| Azo Initiator Concentration, Pounds Per 1,000 Gallons Of Composition | Gelation Time At 65° F., Hours | Gelation Time At 50° F., Hours |
|---|---|---|
| 2 | 9 | — |
| 4 | 3.75 | — |
| 6 | 2.25 | — |
| 10 | 1.5 | — |
| 10[1] | >48 | — |
| 15 | — | 6.25 |
| 20 | — | 3.75 |
| 30 | — | 2.5 |
| 45 | — | 1.75 |
| 45[1] | — | >48 |

[1]Stannous chloride not included in composition.

From Table IV, it can again be seen that the polymeric compositions of the present invention are effective at low temperatures using low quantities of azo initiator.

Thus, the present invention is well adapted to carry out the objects and attain the ends and advantages mentioned as well as those inherent therein. While numerous changes may be made by those skilled in the art, such changes are encompassed within the spirit of this invention as defined by the appended claims.

What is claimed is:

1. An improved method of sealing or plugging a subterranean zone having a temperature below about 70° F. comprising the steps of:

introducing into said zone an aqueous solution of a polymerizable monomer, an azo polymerization initiator and an oxygen scavenger comprised of stannous chloride; and allowing said polymerizable monomer to polymerize in said zone thereby forming a sealing or plugging gel therein.

2. The method of claim 1 wherein said stannous chloride is present in said aqueous solution in an amount in the range of from about 0.005% to about 0.1% by weight of said solution.

3. The method of claim 1 wherein said polymerizable monomer is selected from the group of acrylic acid, methacrylic acid, acrylamide, methacrylamide, 2-methacrylamido-2-methyl propane sulfonic acid, 2-acrylamido-2-methyl propane sulfonic acid, N,N-dimethylacrylamide, vinyl sulfonic acid, N,N-dimethylaminoethylmethacrylate, 2-triethylammoniumethyl methacrylate chloride, N,N-dimethylaminopropylmethacrylamide, methacrylamidopropyl trimethylammonium chloride, N-vinyl pyrrolidone, vinyl phosphonic acid, methacryloyloxyethyl trimethylammonium sulfate and mixtures thereof.

4. The method of claim 3 wherein said polymerizable monomer is present in said aqueous solution in an amount in the range of from about 5% to about 20% by weight of said solution.

5. The method of claim 1 wherein said polymerizable monomer is selected from the group of N-hydroxymethylacrylamide, hydroxyethylacrylate, hydroxyethylmethacrylamide, N-hydroxymethylmethacrylamide and mixtures thereof.

6. The method of claim 5 wherein said polymerizable monomer is present in said aqueous solution in an amount in the range of from about 5% to about 20% by weight of said solution.

7. The method of claim 1 wherein said aqueous solution further comprises a crosslinking multi-functional vinyl monomer selected from the group of glycerol dimethacrylate and diacrylate, ethoxylated and propoxylated glycerol dimethacrylate and diacrylate, ethoxylated and propoxylated glycerol trimethacrylate and triacrylate, ethoxylated and propoxylated trimethylolpropane trimethacrylate and triacrylate, ethoxylated and propoxylated pentaerythritol di, tri and tetra methacrylate and acrylate, methylene-bis-acrylamide and methacrylamide, polyethylene and polypropylene glycol dimethacrylate and diacrylate, allylmethacrylate and acrylate and mixtures thereof.

8. The method of claim 7 wherein said crosslinking monomer is present in said aqueous solution in an amount in the range of from about 0.005% to about 0.5% by weight of said solution.

9. The method of claim 1 wherein said azo polymerization initiator is selected from the group of 2,2'-azobis[2-(2-imidazolin-2-yl)propane] dihydrochloride, 2,2'-azobis(2-methylpropiionamidine) dihydrochloride and 4,4'-azobis(4-cyanovaleric acid).

10. The method of claim 9 wherein said azo polymerization initiator is present in said aqueous solution in an amount in the range of from about 0.001% to about 2% by weight of said solution.

11. An improved polymeric composition for use in performing a completion or remedial procedure in a subterranean zone having a temperature below about 70° F. comprising:

water;

a polymerizable monomer;

an azo polymerization initiator; and an oxygen scavenger comprising stannous chloride.

12. The composition of claim 13 wherein said stannous chloride is present in said aqueous solution in an amount in the range of from about 0.005% to about 0.1% by weight of said composition.

13. The composition of claim 11 wherein said polymerizable monomer is selected from the group of acrylic acid, methacrylic acid, acrylamide, methacrylamide, 2-methacrylamido-2-methyl propane sulfonic acid, 2-acrylamido-2-methyl propane sulfonic acid, N,N-dimethylacrylamide, vinyl sulfonic acid, N,N-dimethylaminoethylmethacrylate, 2-triethylammoniumethyl methacrylate chloride, N,N-dimethylaminopropylmethacrylamide, methacrylamidopropyl trimethylammonium chloride, N-vinyl pyrrolidone, vinyl phosphonic acid, methacryloyloxyethyl trimethylammonium sulfate and mixtures thereof.

14. The composition of claim 13 wherein said polymerizable monomer is present in said aqueous solution in an amount in the range of from about 5% to about 20% by weight of said solution.

15. The composition of claim 11 wherein said polymerizable monomer is selected from the group of N-hydroxymethylacrylamide, hydroxyethylacrylate, hydroxyethylmethacrylamide, N-hydroxymethylmethacrylamide and mixtures thereof.

16. The composition of claim 15 wherein said polymerizable monomer is present in said aqueous solution in an amount in the range of from about 5% to about 20% by weight of said solution.

17. The composition of claim 11 wherein said aqueous solution further comprises a crosslinking multi-functional vinyl monomer selected from the group of glycerol dimethacrylate and diacrylate, ethoxylated and propoxylated glycerol dimethacrylate and diacrylate, ethoxylated and propoxylated glycerol trimethacrylate and triacrylate, ethoxylated and propoxylated trimethylolpropane trimethacrylate and triacrylate, ethoxylated and propoxylated pentaerythritol di, tri and tetra methacrylate and acrylate, methylene-bis-acrylamide and methacrylamide, polyethylene and polypropylene glycol methacrylate and diacrylate allylmethacrylate and acrylate and mixtures thereof.

18. The composition of claim 17 wherein said crosslinking monomer is present in said aqueous solution in an amount in the range of from about 0.005% to about 0.5% by weight of said solution.

19. The composition of claim 11 wherein said polymerization initiator is selected from the group of 2,2'-azobis[2-(2-imidazolin-2-yl)propane] dihydrochloride, 2,2'-azobis(2-methylpropiionamidine) dihydrochloride and 4,4'-azobis(4-cyanovaleric acid).

20. The composition of claim 19 wherein said azo polymerization initiator is present in said aqueous solution in an amount in the range of from about 0.001% to about 2% by weight of said composition.

21. An improved polymeric composition for use in performing a completion or remedial procedure in a subterranean zone having a temperature below about 70° F. comprising:

water;

a polymerizable monomer selected from the group consisting of N-hydroxymethylacrylamide, hydroxyethylacrylate, hydroxyethylmethacrylamide, N-hydroxymethylmethacrylamide and mixtures thereof present in an amount in the range of from about 5% to about 20% by weight of said composition;

an azo polymerization initiator selected from the group of 2,2'-azobis[2-(2-imidazolin-2-yl)propane] dihydrochloride, 2,2'-azobis(2-methylpropiionamidine) dihydrochloride and 4,4'-azobis(4-cyanovaleric acid) present in an amount in the range of from about 0.001% to about 2% by weight of said composition; and an oxygen scavenger comprised of stannous chloride present in an amount in the range of from about 0.005% to about 0.1% by weight of said composition.

22. The composition of claim 21 wherein said polymerizable monomer is hydroxyethylacrylate and said polymerization initiator is 2,2'-azobis(2-methylpropionamidine) dihydrochloride.

* * * * *